May 15, 1945. R. WIDMER 2,376,300
DEVICE FOR CONTROLLING THE SHUTTER WITH A VARIABLE
OPENING OF CINEMATOGRAPHIC PHOTOGRAPHING APPARATUS
Filed July 6, 1943 4 Sheets-Sheet 3
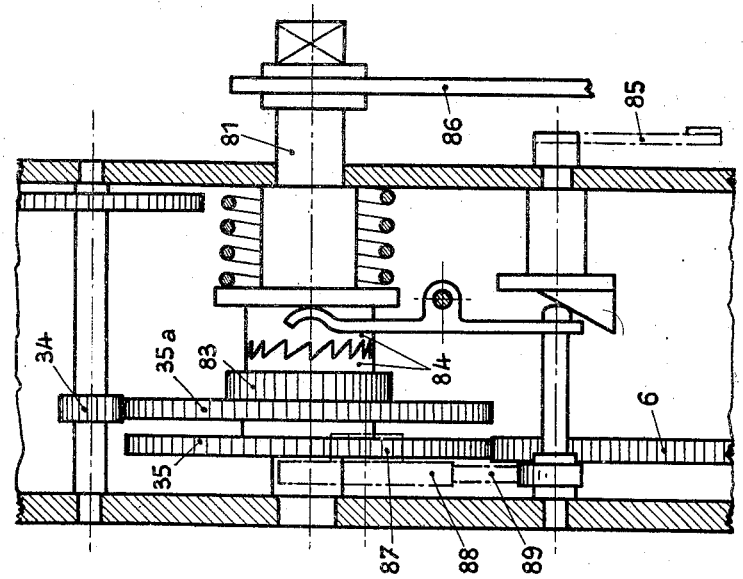
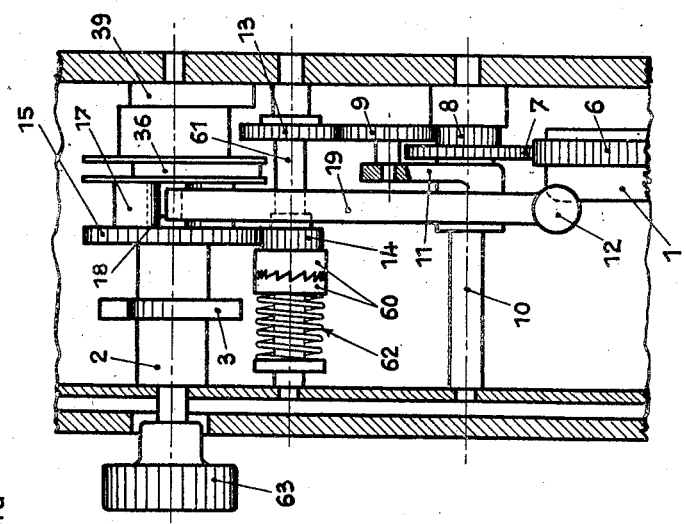
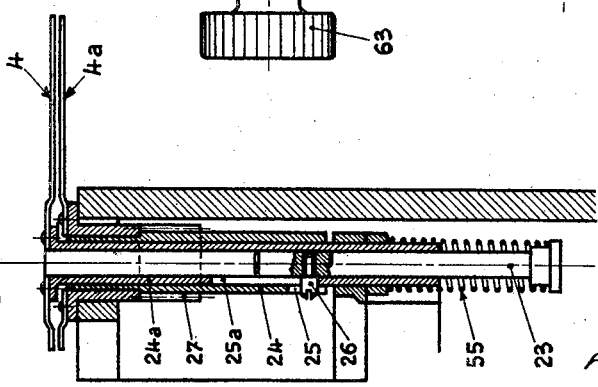
INVENTOR
RENE WIDMER,
ATTORNEYS

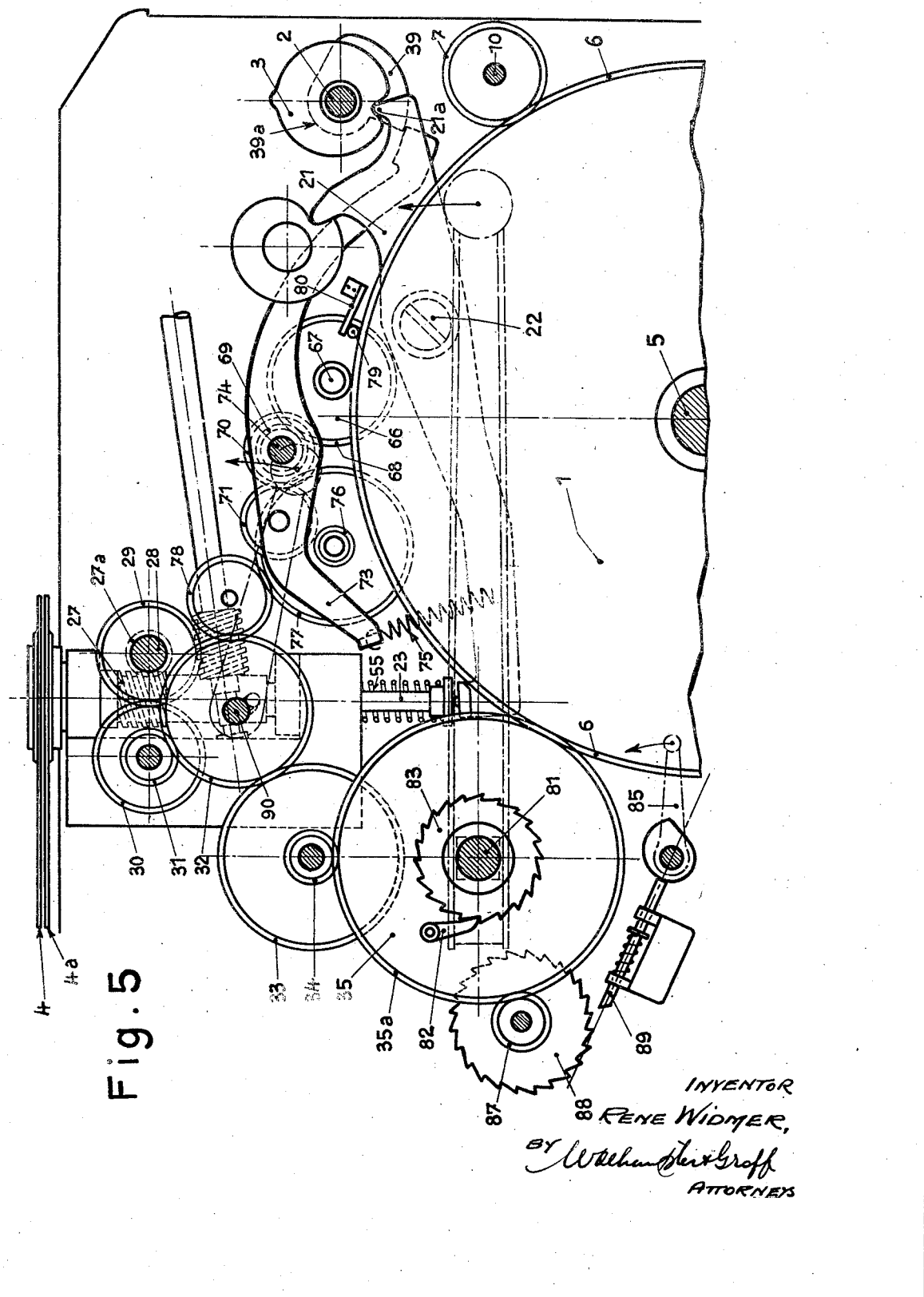

Patented May 15, 1945

2,376,300

UNITED STATES PATENT OFFICE 2,376,300

DEVICE FOR CONTROLLING THE SHUTTER WITH A VARIABLE OPENING OF CINEMATOGRAPHIC PHOTOGRAPHING APPARATUS

René Widmer, Sainte-Croix, Switzerland, assignor to Paillard & Cie. S. A., Sainte-Croix, Switzerland, a corporation of Switzerland Application July 6, 1943, Serial No. 493,680
In Switzerland September 7, 1942

6 Claims. (Cl. 88—19.3)

Various types of shutters with variable openings are in existence for cinematographic photographing apparatus. Some are formed by two blades each of which is secured to a rotary body. These latter are formed by sleeves sliding one upon the other and of which one has a helicoidal slot while the other has a slot arranged along a generating line.

In the interior of these sleeves slides a shaft provided with a pin passing through the slots of each of the sleeves. This pin thus constitutes a mechanical connecting member between the sleeves among themselves and an axial movement of this connecting member produces a relative angular movement between the two blades, which movement determines the opening of the shutter. The helicoidal slot is provided in such a manner as to control an angular movement of the blades relatively to one another corresponding approximately to the angle at the apex of the sector represented by one blade, in such a manner as to enable a complete opening and closing of the shutter to be effected.

These shutters with a variable opening are extremely practicable and enable very fine "fadings" to be obtained, but their automatic control is not very easy. In particular it is difficult to stop the feed mechanism of the film and the shutter automatically in exactly the desired position that is to say with the objective closed.

But it is essential that this condition should be fulfilled as after a fading out the operator should in general change his position for effecting a lap dissolve of a new scene. In order to avoid wasting the film it is necessary to stop the film as soon as the shutter is closed completely.

In order to enable a lap dissolve with superposition to be obtained it is necessary to open the blades of the shutter while the photographic apparatus is stopped without uncovering the objective. In other words the stopping position of the shutter after a fading out must be well defined and correspond with the position in which the shutter with the open blades closes the objective of the photographing apparatus.

The present invention has for its subject a device for controlling the shutter with variable opening for a cinematographic photographing apparatus, the shutter being provided with blades carried by co-axial rotary supports the movements of which are controlled by a mechanical connecting member so that the axial movements determine the relative angular position of the blades, these axial movements being controlled by at least one rotary cam for controlling a complete closing of the blades of the shutter. This control device is for the purpose of enabling the shutter to be stopped in the exact position desired. It is characterised by a locking device located between a member driven through suitable gearing by the shutter at a relatively high speed and a cam for controlling the locking which turns slowly, this device including a catch, located in the path of a stop secured to the member having a high speed of rotation, of which the locking movement is controlled by the control cam, the locking position corresponding to a position determined by the shutter, means being provided for withdrawing the catch from the path of the stop without modifying the angular position of the shutter and for resetting the locking device during the stopping of the photographic apparatus.

One form of construction of the control device suitable for an amateur cinematographic photographing apparatus is shown diagrammatically and by way of example in the accompanying drawings, wherein:

Fig. 3 is a detail view showing the actuation of the blades.

Fig. 4 is a partial side view showing the control of the cam shaft.

Fig. 5 is a front view of the device for controlling the opening and closing of the blades, and of the drive for the shutter, some of the members being omitted for greater clearness.

Fig. 6 is a partial view of the clutch between the driving mechanism for the film and the barrel.

Figure 1:
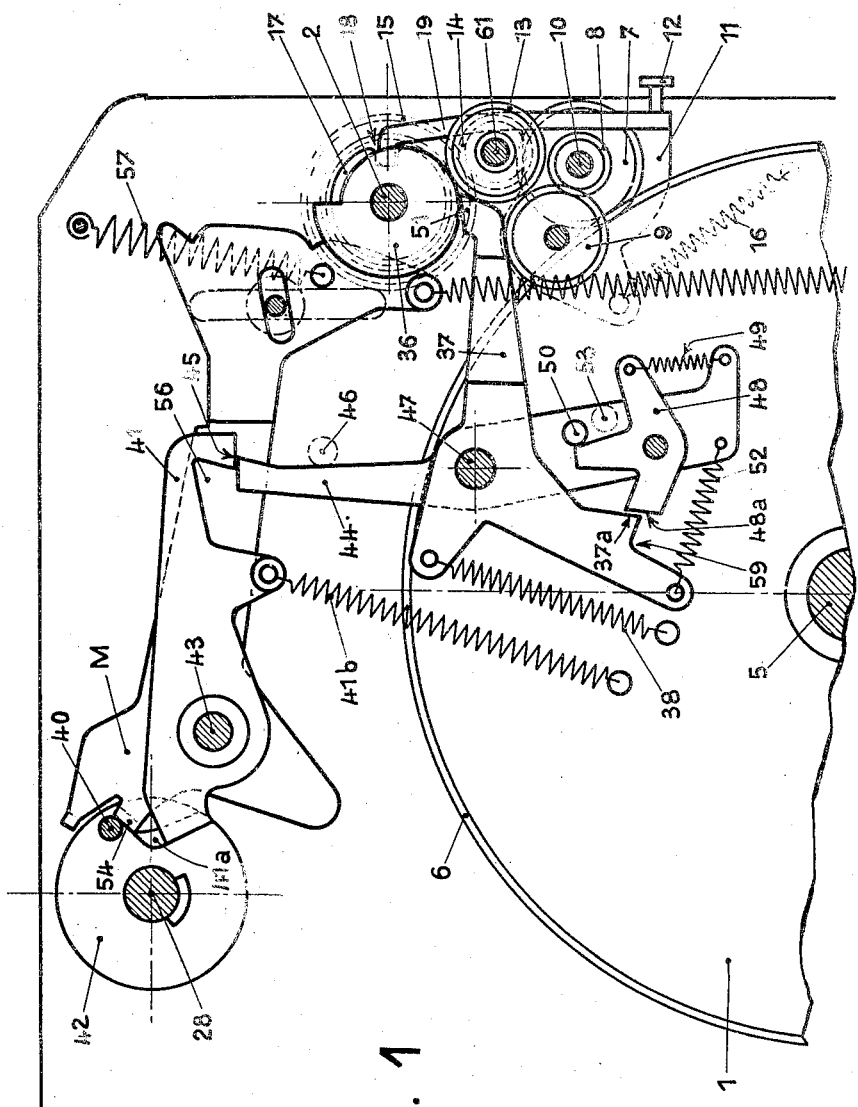
Fig. 1 is a front view of the device, one of the walls of the camera being omitted, the device being in the locked position and the photographing apparatus stopped.

A spring motor, located in a barrel 1, drives: a mechanism for feeding the film (not shown), the variable shutter, a cam shaft 2 carrying the control cam 3 (Fig. 4) of the device for opening and closing the blades 4 and 4a of the variable shutter. One of the ends of the motor spring is attached to a stationary shaft 5 and the other end is secured to the barrel 1. This latter is provided at its periphery with teeth 6 engaging with a gear train 7, 8, 9. The pinions 7 and 8, secured together, are mounted loosely on a shaft 10 while the pinion 9 is pivoted on an oscillating support 11 secured to the shaft 10. The oscillating support carries an operating member 12 enabling the pinion 9 to be brought into engagement with the gear train 13, 14, 15, against the action of a spring 16. The pinion 15 is secured to the cam shaft 2. The latter carries a number of cams necessary for controlling the shutter of variable opening. The members necessary for this control are shown in Figs. 1, 4 and 5.

The shaft 2 carries the control cam 3 for the automatic opening and closing of the blades of the variable shutter (Figs. 3 to 5).

A lever 21 (Fig. 5) pivoted at 22 on a stationary part, carries at one of its ends, a finger 21a sliding on the periphery of the cam 3. The other end of this lever acts axially on a shaft 23 whose axial movements control the relative angular movements of the blades 4. One of the blades is secured to a rotary body formed by a sleeve 24 (Fig. 3) provided with a helicoidal slot 25 while the other is mounted on a sleeve 24a provided with a slot 25a arranged along a generating line. A pin 26, secured to the shaft 23 passes through the two slots 25 and 25a and connects the two sleeves together mechanically. The sleeve 24 is provided with a helicoidal wheel 27 gearing with a helicoidal wheel 27a secured to a shaft 28 connected mechanically by a gear train 29, 30, 31, 32, 33, 34, 35 and 35a (Fig. 6) to the flange 6 of the barrel.

The shaft 2 also carries a locking cam 17 provided with a circular outline broken by a notch 18 (Figs. 1 to 4). A finger 19 secured to the support 11 co-operates with this cam and is held in contact with its periphery by the spring 16. When the finger 19 is in the notch 18 the pinions 9 and 13 are out of engagement. On the other hand the pinions 9 and 13 are held in engagement as long as the finger 19 is on the circular portion of the cam 17. The notch 18 thus determines the stopping position of the cam shaft 2.

A cam 36 (Figs. 1 and 2) controlling the automatic stop of the shutter and the feed mechanism for the film after the complete closing of the blades of the shutter, is also mounted on the shaft 2.

Figure 2:
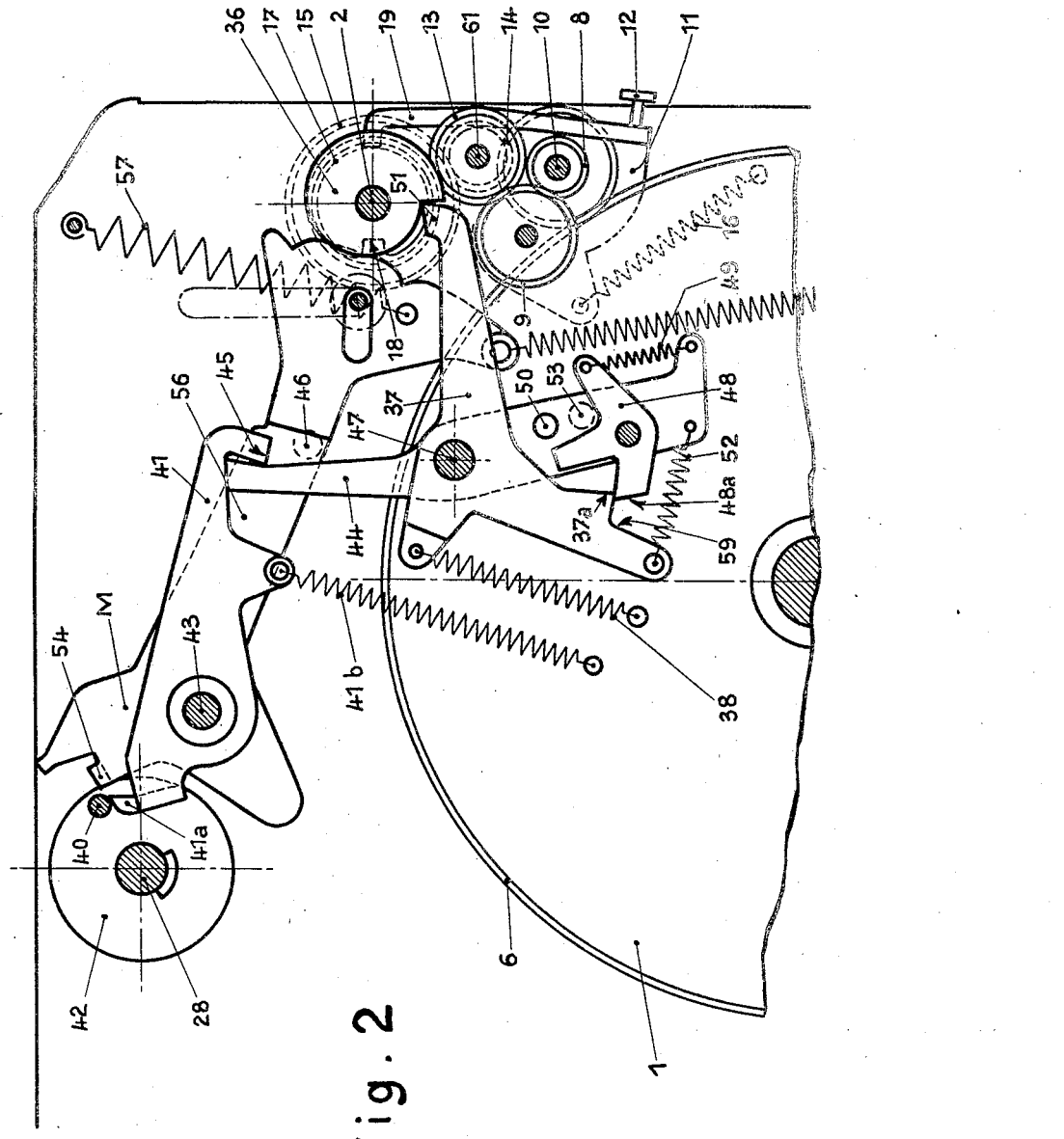
Fig. 2 is a front view of a device similar to that in Fig. 1, but with the device in the automatic stop position after fading out.

This cam has a profile which progresses in the form of a spiral and on which slides a nose 51 formed by the end of a lever 37. This lever is repelled during the closing of the blades by the cam 36 against the action of a spring 38. When the blades are closed, the nose of the lever 37 falls on the start of the spiral (Fig. 2). This oscillation of the lever 37 produces the stopping of the shutter in the closing position by means of a device described hereinafter.

A cam 39 (Fig. 5) mounted on the shaft 2 controls the setting in operation of a device for indicating the starting of the closing movement of the blades of the shutter. This cam has an angular length of at least 180°.

The automatic stopping device (Figs. 1 and 2) is provided with a stop member 40 secured to a plate 42, keyed to the shaft 28, which turns at the same speed as the variable shutter. A lever 41 pivoted at 43 to a stationary part has a portion 41a adapted to be placed into the path of the stop 40 (Fig. 2). During the operation of the photographing apparatus this lever 41 is held by a catch in the position shown in Fig. 1 against the action of a spring 41b.

This catch is formed by a lever 44 one end of which engages a bearing surface 45 provided at one of the ends of the lever 41. A stop 46 determines the locking position of the lever 44. This lever is pivoted on a shaft 47 secured to a fixed part and carries at its free end an oscillating lever 48. This is held by a spring 49 in contact with a pin 50 secured to the catch 44.

The lever 37 pivoted on the shaft 47 has a portion 37a adapted to act on one of the noses of the oscillating lever 48 when the nose 51 falls on the start of the spiral of the cam 36. A spring 52, one end of which is attached to the lever 37 and the other to the catch 44, tends to hold the latter against its stop 46. A stop 53 secured to a fixed part limits the movement of the oscillating lever 48.

The operation of this device is as follows:

The starting of the photographing apparatus is controlled by the withdrawal, from the path of the stop 40, of a part 54, provided on a starting and stopping lever M pivoted on the shaft 43 (Figs. 1 and 2). As the stop 40 is no longer held the spring motor drives the mechanism for feeding the film and also the shutter. When the operator desires to effect a fading, he applies a push to the operating member 12. This push releases the finger 19 from the notch 18 and releases the cam shaft. Simultaneously the pinions 9 and 13 are brought into engagement in such a manner that the spring motor drives the cam shaft 2.

The cam 3 commences to rotate in an anticlockwise direction from the position shown in Fig. 5. The finger 21a rises on the profile of this cam 3, and the lever 21 oscillates about the shaft 22 and its end pushes the shaft 23 against the action of a spring 55. The axial movement of this shaft produces a relative angular movement of the two blades 4 and 4a in the closing direction of the shutter.

After the cam shaft 2 has rotated through 180° the finger 21a reaches the top of the cam 3 and the shutter is closed completely. At this moment, the cam 36 having also made a rotation of 180°, the nose 51 falls on the start of its spiral profile. While falling the lever 37 pivots on its shaft 47 and the part 37a acts on the arm 48a of the oscillating lever 48. The latter moves the catch 44 through the medium of its pin 50.

The catch 44 slides under the bearing face 45 of the lever 41 in such a manner that the latter rocks under the action of its spring 41b until the bottom of a recess 56 is in contact with the end thereof. As the action of the lever 37 continues the lever 48 slides on the fixed stop 53 and oscillates. This movement stretches the spring 49 and disengages its end 48a from the part 37a of the lever 37. The respective positions of these levers are thus shown in Fig. 2.

In this position the part 41a is in the path of the stop 40, which is held during its first passage. This stop is placed on the plate in such an angular position that when it is in contact with the part 41a, the blade 4a is in the position for closing the objective. The starting lever in the meantime has been held, either manually by the operator or by a device provided for this purpose, in the "operating" position (Fig. 2).

The blades being now closed automatic stopping has been effected and the operator releases the lever M. Under the action of a spring 57 the latter returns into the "stop" position (Fig. 1). During this movement the part 54 pushes the part 41a and assumes the position of the latter. The bearing faces of these parts adapted to hold the stop 40 are located in the same plane or more exactly on the same circle centered on the shaft 43.

It consequently follows that the stop 40 cannot modify its angular position and the shutter and the whole of the mechanism for feeding the film remain in position.

When the lever M is in the stop position, the lever 41 is again in the position shown in Fig. 1. The catch 44 returns to its stop 46 under the action of the spring 52, while the arm 48a of the oscillating lever 48 engages with a recess 59 in the lever 37. The latter remains in the position shown in Fig. 2 and is not returned by the cam into the position shown in Fig. 1 until after a further rotation through 180° of the cam shaft 2; during which rotation the cam 3 controls the opening of the blades.

After having returned the lever M into the stop position, the apparatus may again be set in operation. As the cam shaft 2 is always connected mechanically to the spring motor, this is set in rotation at the same time as the shutter, and it controls the opening of the blades of the latter, when these latter are open the finger 19 falls into the notch 18, locks the cam shaft and disengages the pinions 9 and 13 from one another. Thus the device for controlling the variable shutter is declutched and maintained in position while the mechanism for feeding the film and the shutter remain connected to the motor.

Finally a clutch 60 (Fig. 4) with a single direction of drive, is interposed between the pinions 14 and 13. One of the parts of this clutch is secured to the pinion 14 which is mounted loosely on a shaft 61 carrying the pinion 13 which is fixed rigidly thereto. The other part of this clutch slides on the shaft 61 and is driven in rotation thereby. The two parts of the clutch are applied against one another by a spring 62.

An operating button 63 enables the cam shaft 2 to be driven manually. Thus after a fading out it is possible, by operating the button 63, to bring the cam shaft up to its locked position. This rotation of the cam shaft controls the opening of the blades of the shutter and this takes place because the clutch teeth slide upon one another so that the barrel 1 is not driven.

As one of the blades of the shutter remains in the closing position no ray of light can reach the film during this operation.

The operator is thus enabled to re-start the photographing apparatus with an open shutter even after a fading out.

The clutch 60 also enables the spring motor to be re-wound by driving the barrel in the opposite direction and this without modifying the position of the cam shaft. This is necessary so as to enable the operator to rewind the motor after a fading out before taking the succeeding scene.

Th device for indicating the start of a fading out actuated by the cam 39 (Fig. 5) is provided with a disc 66 pivoted on a shaft 67. This disc is driven by a gear train 68, 69, 70, 71. The latter pinion is carried by a lever 73 pivoted on the shaft 74 about which the pinions 69 and 70 rotate. One end of this lever is pressed against the cam 39 by a spring 75. According to the position of the lever 73 the pinion 71 is engaged or disengaged from the pinion 76 driven by the pinion 32 through the medium of the gear train 77, 78.

A torsion spring (not shown) mounted on the shaft 67 tends to cause this to rotate in an anticlockwise direction and to hold a pin 79 of the disc 66 in engagement with a fixed stop 80.

The toothed wheel 35a (Figs. 5 and 6) is mounted loosely on a shaft 81 and carries a pawl 82 subjected to the action of a spring tending to hold it in engagement with the teeth of the ratchet wheel 83. This latter is secured to one of the parts of a clutch 84 of which the other part is driven by the shaft 81 and slides on this latter.

A handle 85 enables the two parts of the clutch 84 to be separated from one another. The end of the shaft 81 is provided to receive a winding crank 86.

A wheel 35, keyed to the shaft 81, engages with the flange 6 and the pinion 87. The latter is secured to a ratchet wheel 88. A movable stop 89, actuated by the crank 85, is adapted to engage with the teeth of the wheel 88 when the clutch 84 is disengaged so that the barrel cannot turn idly.

The clutch 84 and the movable stop enable the barrel to be isolated from the feed mechanism for the film and the driving mechanism of the shutter.

The operator may consequently place the lever M in the operative position (Fig. 2) in such a manner as to disengage the part 54 from the path of the stop 40. Then by means of a handle, placed on the shaft 90 (Fig. 5) secured to the pinion 32, the film may be advanced or retracted at will. As the mechanism is isolated from the barrel the latter is not driven and consequently cannot drive the cam shaft 2.

In the locked position of the cam shaft the end of the lever 73 is ready to fall into the notch of the cam 39. From the commencement of the movement of rotation of the cam shaft, that is to say from the commencement of closing the blades of the shutter, the lever 73 oscillates and produces the engagement of 71 with 76 and the driving of the disc 66 against the action of its return spring. During the automatic stopping, when the blades of the shutter are closed, the pin 79 has described a pre-determined arc of a circle and has been removed from its stop 80.

If then the operator desires to effect lap dissolves with covering, he may bring the film in the position of starting of the closing of the blades, by operating the shaft 90 in such a manner as to cause the pin 79 to return against its stop 80. During this operation, as the barrel is not driven, the cam shaft thus rests in the position shown in Fig. 2 and the blades of the shutter remain closed. The coming into contact of the pin 79 with the stop 80 thus automatically determines the position which the film has at the beginning of the fading operation. As the control of the closing of the blades is effected during the course of a rotation through 180° of the cam shaft, it is evidently necessary for the circular portion 39a of the cam 39, which holds the pinions 71 and 76 in engagement under the action of the spring 75, to have an angular length of at least 180°.

Having now particularly described and ascertained the nature of my said invention and in what manner the same is to be performed I declare that what I claim is:

1. A device of the type described comprising a shutter having a variable opening, said shutter comprising a pair of rotatable overlying blades, a pair of concentric coaxial sleeves provided with a slot formed in each wall thereof, said slots being angularly disposed with respect to each other, one of said blades being fixedly mounted on one end of one of said sleeves, the other of said blades being secured to the other of said sleeves, a shaft concentrically and coaxially disposed with respect to said sleeves, a pin mounted on said shaft, said pin being adapted to slide in said slots to effect a relative angular displacement of said blades when said shaft is displaced axially, means for effecting said axial displacement comprising a lever and a cooperating cam, said lever having one of its ends abutting one end of said shaft, the other end of said lever abutting the periphery of said cam, driving means for rotating said cam, means for stopping the rotation of said cam in a predetermined position, a cam shaft for said cam, a gear mounted on said cam shaft, said driving means comprising a spring wound motor interconnected with a gear train, and means for clutching said gear and said gear train to rotate said cam shaft.

2. A device of the type described comprising film feeding means, a shutter having a variable opening, said shutter comprising a pair of rotatable overlying blades, a pair of concentric coaxial sleeves provided with a slot formed in each wall thereof, said slots being angularly disposed with respect to each other, one of said blades being fixedly mounted on one end of one of said sleeves, the other of said blades being secured to the other of said sleeves, a shaft concentrically and coaxially disposed with respect to said sleeves, a pin mounted on said shaft, said pin being adapted to slide in said slots to effect a relative angular displacement of said blades when said shaft is displaced coaxially, means for effecting said axial displacement comprising a lever and a cooperating cam, a cam shaft on which said cooperating cam is fixedly mounted, said lever having one of its ends abutting one end of said shaft, the other end of said lever abutting the periphery of said cam, a gear mounted on said cam shaft to rotate therewith, motor means for driving said film feeding means, a gear train, and means for clutching said gear train with said gear to rotate said cam shaft.

3. A device of the type described in claim 2, and a second cam fixedly mounted on said cam shaft, said second cam being provided with a notch in the periphery thereof, said clutching means comprising an oscillating element on one end of which said gear train is mounted, the other end of said element being provided with a finger portion, said finger portion being adapted to ride on the periphery of said second cam, said finger when engaging said notch portion of said second cam locking said cam shaft against further rotation and simultaneously therewith disengaging said gear from said gear train.

4. A device of the type described comprising film feeding means, a shutter having a variable opening, said shutter comprising a pair of rotatable overlying blades, a pair of concentric coaxial sleeves provided with a slot formed in each wall thereof, said slots being angularly disposed with respect to each other, one of said blades being fixedly mounted on one of said sleeves, the other of said blades being fixedly mounted on the other of said sleeves, a shaft concentrically and coaxially disposed with respect to said sleeves, a pin mounted on said shaft, said pin being adapted to slide in said slots to effect a relative angular displacement of said blades when said shaft is displaced axially, a cam shaft, a plurality of cams fixedly mounted on said cam shaft, one of said cams being provided with a locking notch on the periphery thereof, a gear wheel fixedly mounted on said cam shaft, a motor, a gear train, an oscillating element, said gear train being mounted on one end of said element, the other end of said element being provided with a finger portion adapted to ride on the periphery of said cam formed with said locking notch, said element when in operating position interconnecting said motor, said gear train and said gear to drive said cam shaft, a pivoted lever, said pivoted lever having one of its ends abutting one end of said shaft, the other end of said lever abutting the periphery of a second cam mounted on said cam shaft, whereby a rotation of said second cam produces an angular movement of said lever, said movement of said lever imparting an axial displacement of said shaft, and automatic means for stopping said shutter and said film feed means upon complete closing of said shutter blades.

5. A device of the type described in claim 4, said automatic means comprising a rotatable disc, a stop pin mounted on said disc for rotation therewith, means for gearing said disc with said film feed means, manually operated means for actuating said motor means and the shutter actuating means, a third cam mounted on said cam shaft and means cooperating with said third cam and said pin to lock said pin against rotation after said third cam has rotated 180 degrees.

6. A device of the type described comprising film feeding means, a shutter having a variable opening, said shutter comprising a pair of rotatable overlying blades, a pair of concentric coaxial sleeves provided with a slot formed in each wall thereof, said slots being angularly disposed with respect to each other, one of said blades being fixedly mounted on one of said sleeves, the other of said blades being fixedly mounted on the other of said sleeves, a shaft concentrically and coaxially disposed with respect to said sleeves, a pin mounted on said shaft, said pin being adapted to slide in said slots to effect a relative angular displacement of said blades when said shaft is displaced axially, a cam shaft, a plurality of cams fixedly mounted on said cam shaft, one of said cams provided with a locking notch on the periphery thereof, a gear wheel fixedly mounted on said cam shaft, a motor, a gear train, an oscillating element, said gear train being mounted on one end of said element, the other end of said element being provided with a finger portion adapted to ride on the periphery of said cam formed with said locking notch, said element when in operating position interconnecting said motor, said gear train and said gear to drive said cam shaft, a pivoted lever, said pivoted lever having one of its ends abutting one end of said shaft, the other end of said lever abutting the periphery of a second cam mounted on said cam shaft, whereby a rotation of said second cam produces an angular movement of said lever, said movement of said lever imparting an axial displacement of said shaft, and automatic means for stopping said shutter and said film feed means upon complete closing of said shutter, said automatic means comprising a rotatable disc, a stop pin mounted on said disc for rotation therewith, means for gearing said disc with said film feed means, manually operated means for actuating said motor means and the shutter actuating means, a third cam mounted on said cam shaft and means cooperating with said third cam and said pin to lock said pin against rotation after said third cam has rotated 180 degrees, and means for returning said film to starting position, said means being operable without moving the closed shutter blades.

RENÉ WIDMER.